United States Patent [19]
Toepfer et al.

[11] Patent Number: 5,336,934
[45] Date of Patent: Aug. 9, 1994

[54] ELECTRICAL CONNECTION AND INTERLOCK CIRCUIT SYSTEM FOR VEHICLE ELECTRIC DRIVE

[75] Inventors: Craig B. Toepfer, Dearborn; Robert K. Brown, Plymouth, both of Mich.

[73] Assignee: Ford Motor Company, Dearborn, Mich.

[21] Appl. No.: 991,881

[22] Filed: Dec. 17, 1992

[51] Int. Cl.$^5$ .............................................. H02G 3/00
[52] U.S. Cl. ................................... 307/10.1; 439/34; 439/299
[58] Field of Search ................. 307/10.5, 10.1, 10.3, 307/10.7; 361/174; 439/34, 299, 553–555, 557, 558, 567; 340/636, 638, 438, 455; 320/48, 40, 13; 324/426, 433

[56] References Cited

U.S. PATENT DOCUMENTS 3,876,884  4/1975  Housman et al. .............. 307/10 AT
4,079,304  3/1978  Brandenburg ..................... 320/25

*Primary Examiner*—A. D. Pellinen
*Assistant Examiner*—Aditya Krishnan
*Attorney, Agent, or Firm*—Roger L. May; Mark S. Sparschu

[57] ABSTRACT

An electrical connection and interlock circuit system (20) operates between a battery (14) and a drive motor (16) of a vehicle electric drive. Circuit system (20) includes a connection circuit (22) having first and second connectors (24) and (26) for energizing the drive motor (16) by the battery (14) and also includes an interlock circuit (28) that operates to electrically disconnect the connection circuit when either connector is in a partially connected position. The circuit system (20) also includes a power connector housing (46) at which the second connector (26) is located along with a third connector (66) that is connected to the drive motor (16), and a mechanical interlock (66) prevents disconnection of the third connector until after the second connector is disconnected so that there is no power at the third connector during its connection or disconnection.

14 Claims, 3 Drawing Sheets

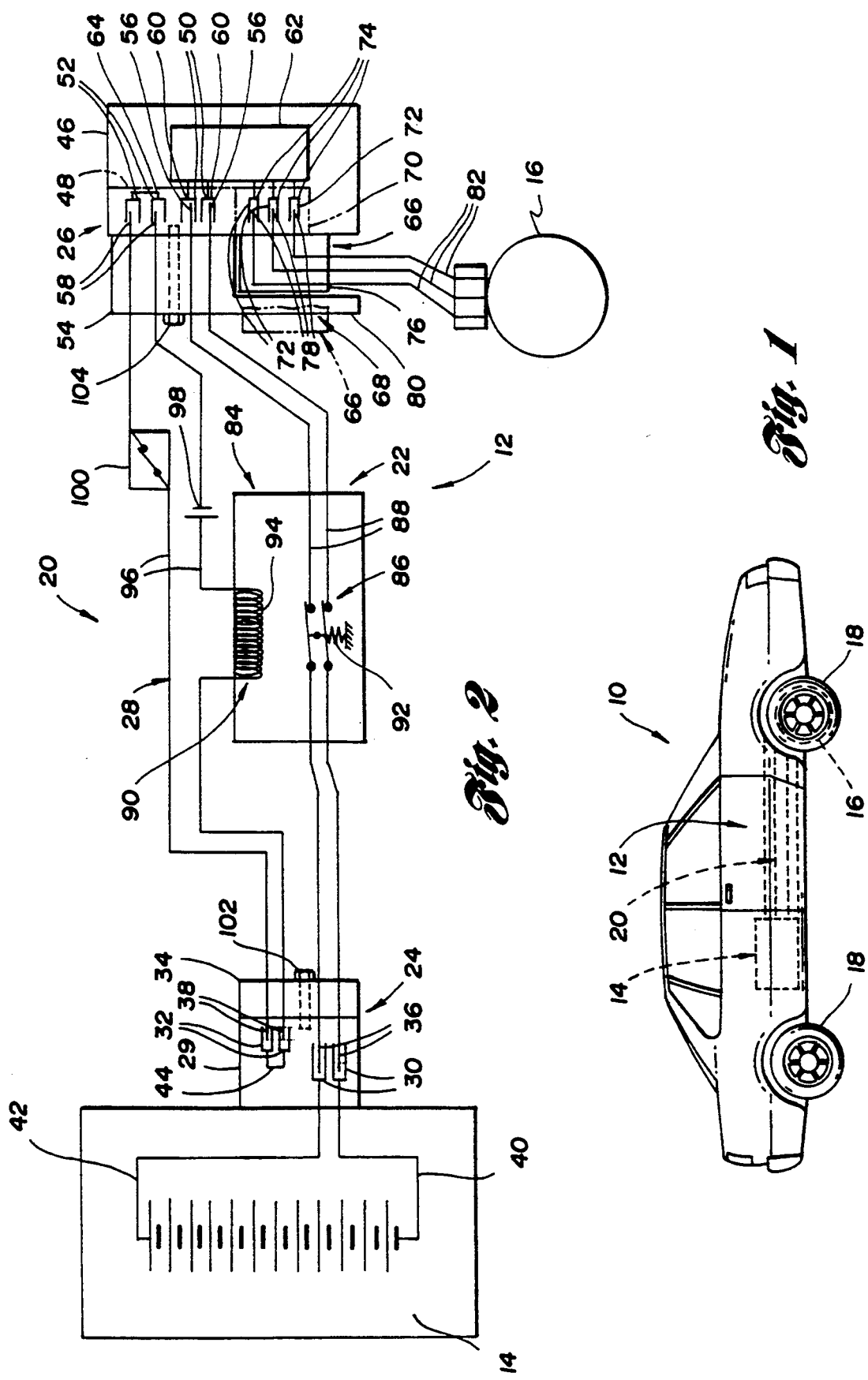

ELECTRICAL CONNECTION AND INTERLOCK CIRCUIT SYSTEM FOR VEHICLE ELECTRIC DRIVE

TECHNICAL FIELD

This invention relates to a circuit system for use with a vehicle electric drive between a battery and an electric drive motor.

BACKGROUND ART

Vehicles having an electric drive conventionally utilize a high voltage storage battery for energizing an electric drive motor that operates the vehicle. Because of the large voltage utilized such as on the order of 330 volts, it is desirable to prevent arcing and to also isolate energized components from a person doing routine maintenance or other servicing.

Prior art patents which were noted during an investigation conducted for the present application include U.S. Pat.. Nos. 2,445,927 Shaw; 3,114,871 Schenkelberger; 3,497,027 Wild; 3,524,029 Laff; 3,581,480 O'-Connor, III et al.; 3,728,586 Inhelder et al.; 3,919,507 Middleton, Jr.; 3,982,803 Bennett; 3,986,095 Nakai et al.; 4,387,951 Hall et al.; 4,443,676 Castonguay; and 4,807,895 Thomas et al.

DISCLOSURE OF INVENTION

An object of the present invention is to provide an improved circuit system for an electric drive of a vehicle so as to prevent arcing and to also isolate energized electrical components of the system during routine maintenance and other servicing.

In carrying out the above and other objects of the invention, a vehicle electric drive including a battery and an electric drive motor also includes an electrical connection and interlock circuit system according to the present invention. This circuit system includes a connection circuit having a first connector for detachably connecting to the battery upon movement between a detached position and fully connected position through a partially connected position. The connection circuit also has a second connector for detachably connecting to the drive motor upon movement between a detached position and a fully connected position through a partially connected position. An electrical interlock circuit of the system functions to: (a) electrically connect the first and second connectors with each other when both connectors are in their fully connected positions to thereby permit electrical operation of the drive motor through the connection circuit, and (b) electrically disconnect the first and second connectors from each other when either connector is in its partially connected position to ensure that the drive motor is then not electrically energized through the connection circuit.

In the preferred construction, the electrical connection and interlock circuit system has the first connector constructed to include a battery mounted receptacle having connection sockets and interlock sockets. The first connector also is constructed to include a plug having connection prongs and interlock prongs that are respectively received by the connection sockets and interlock sockets of the battery mounted receptacle to close the connection and interlock circuits at the first connector. The connection and interlock sockets of the battery mounted receptacle and the connection and interlock prongs of the plug of the first connector are positioned such that (a) the connection circuit is closed at the first connector in the partially connection position thereof while the interlock circuit is open, and (b) the connection and interlock circuits are both closed at the first connector in its fully connected position.

In its preferred construction, the electrical connection and interlock circuit system is also provided with an electrical power connection housing, and the second connector includes a housing mounted receptacle having connection and interlock sockets. In addition, the second connector also includes a plug having connection prongs and interlock prongs that are respectively received by the connection sockets and interlock sockets of the housing mounted receptacle to close the connection and interlock circuits at the second connector. The connection and interlock sockets of the housing mounted receptacle and the connection and interlock prongs of the plug of the second connector are positioned such that (a) the connection circuit is closed at the second connector in the partially connected position thereof while the interlock circuit is open, and (b) the connection and interlock circuits are both closed at the second connector in its fully connected position.

In the preferred construction, the electrical connection and interlock circuit system includes the electrical power connection housing at which the second connector is detachably connected and the connection circuit also has a third connector that is connected to the drive motor and detachably connected to the electrical power connection housing upon movement between detached and connected positions to energize the drive motor when the first and second connectors are in their fully connected positions and connected by the interlock circuit. The second connector has a mechanical interlock that prevents detachment of the third connector from the power connection housing when the second connector is connected to the power connection housing. The second and third connectors each includes an associated housing mounted receptacle having sockets and also includes an associated plug having prongs that are received by the sockets of the associated receptacle. Furthermore, the mechanical interlock of the second connector includes an interlock plug portion that is positioned over the plug of the third connector when the second and third connectors are both connected to the power connection housing such that the third connector cannot be disconnected until after the second connector is disconnected.

In the preferred construction, the interlock circuit of the circuit system includes an interlock switch for opening and closing the connection circuit between the first and second connectors. An actuator of the controller closes the interlock switch when the first and second connectors are in their fully connected positions and opens the interlock switch when either the first or second connector is in its partially connected position. The interlock switch of the controller is normally open in the preferred construction and the actuator of the controller includes a coil that is energized by the interlock circuit to close the interlock switch when the first and second connectors are in their fully connected positions. The interlock circuit also preferably includes an inertia responsive switch for opening the interlock circuit upon abrupt vehicle deceleration such that the coil of the controller is then de-energized to open the interlock switch of the controller and electrically disconnect the first and second connectors of the connection circuit.

In the preferred construction, the first connector includes a retainer for securing the first connector in its fully connected position. Likewise, the preferred construction also has the second connector provided with a retainer for securing the second connector in its fully connected position. Thus, the preferred construction has both the first and second connectors each provided with an associated retainer for securing the associated connector in its fully connected position.

BRIEF DESCRIPTION OF DRAWINGS

FIG. 1 is a schematic view of a vehicle including an electric drive that embodies the present invention;

FIG. 2 is a schematic view of an electrical connection and interlock circuit system of the invention with the circuitry shown in its connected position to operate a drive motor from an associated storage battery;

BEST MODE FOR CARRYING OUT THE INVENTION

Figure 3:
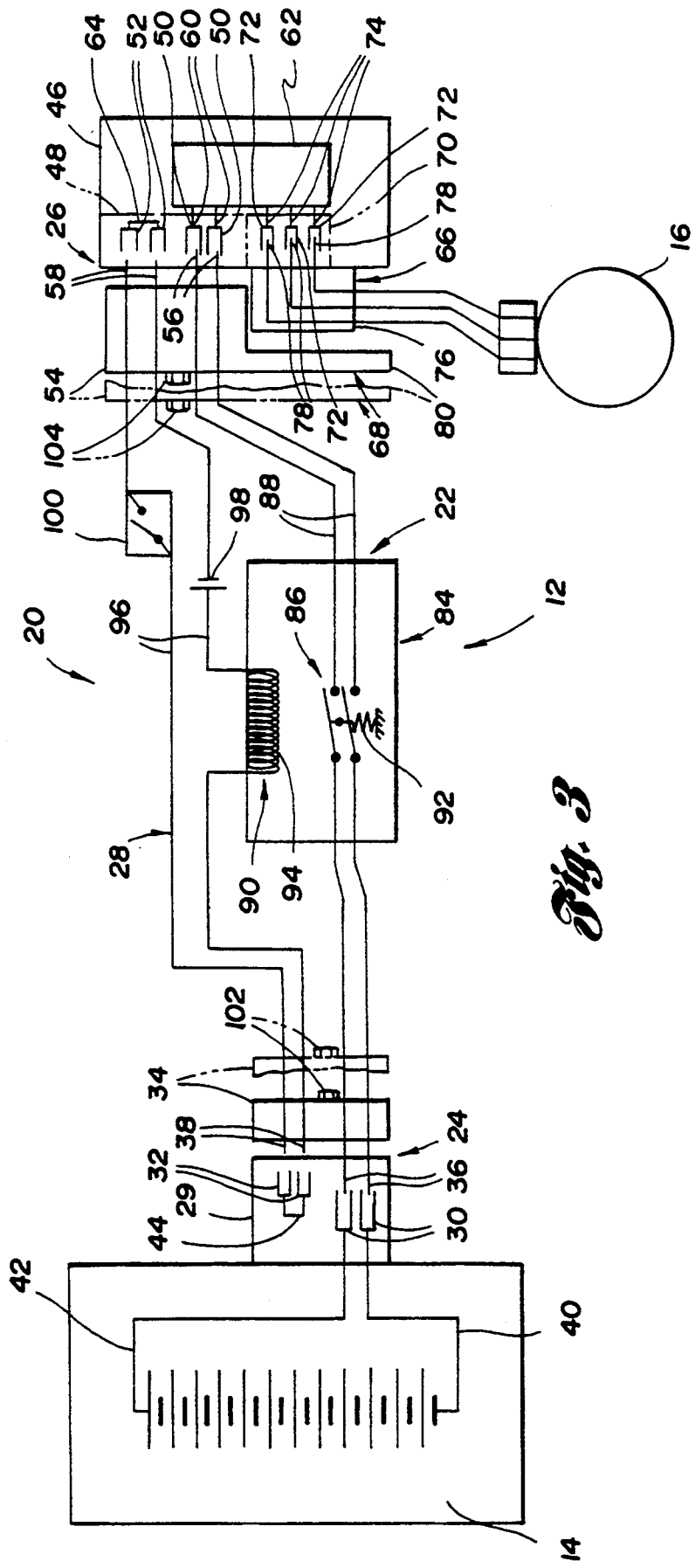
FIG. 3 is a schematic view of the electrical connection and interlock circuit system shown with its circuitry open between the drive motor and the storage battery.

As illustrated in FIG. 1 of the drawings, a vehicle generally illustrated by 10 includes an electric drive 12 having a storage battery 14, an electric drive motor 16 for driving the wheels 18, and an electrical connection and interlock circuit system 20 that is constructed in accordance with the present invention. This circuit system 20 as is hereinafter more fully described in connection with FIGS. 2 and 3 controls operations of the drive motor 16 by the storage battery 14.

With reference to FIG. 2, the electrical connection and interlock system 20 includes a connection circuit 22 having a first connector 24 for detachably connecting to the battery 14. This detachable connection takes place as is hereinafter more fully described as the connector 24 is moved from a phantom line indicated detached position as shown in FIG. 3 to the fully connected position of FIG. 2 through a partially connected position shown by solid line representation in FIG. 3. The connection circuit 22 also has a second connector 26 for detachably connecting to the drive motor 16 upon movement between a detached position shown by phantom line representation in FIG. 3 and a fully connected position shown in FIG. 2 through a partially connected position shown by solid line representation in FIG. 3.

As illustrated in both FIGS. 2 and 3, the circuit system 20 also includes an electrical interlock circuit 28 that controls the connection circuit 22. More specifically, as shown in FIG. 2, the interlock circuit 28 electrically connects the first and second connectors 22 and 24 with each other when both connectors are in their illustrated fully connected positions to thereby permit electrical operation of the drive motor 16 through the connection circuit. Furthermore, as illustrated in FIG. 3, the electrical interlock circuit 28 electrically disconnects the first and second connector 24 and 26 from each other when either connector is in its partially connected position to ensure that the drive motor 16 is not electrically energized through the connection circuit.

As shown in FIGS. 2 and 3, the first connector 24 includes a battery mounted receptacle 29 having connection sockets 30 and interlock sockets 32. The first connector 24 also includes a plug 34 having connection prongs 36 and interlock prongs 38 that are respectively received as shown in FIG. 1 by the connection sockets 30 and interlock sockets 32 of the battery mounted receptacle 28 to close the connection and interlock circuits at the first connector. More specifically, the connection sockets 30 are connected by wires 40 and 42 to the opposite poles of the battery 14 while the interlock sockets 32 are connected to each other by a wire 44. As shown in FIG. 3, the connection and interlock sockets 30 and 32 of the battery mounted receptacle 29 and the connection and interlock prongs 36 and 38 of the plug 34 of the first connector 24 are positioned such that the connection circuit 22 is closed at the first connector in the solid line indicated partially connected position thereof while the interlock circuit 28 is open. In other words, connection prongs 36 are received within the connection sockets 30 upon insertion before the interlock prongs 38 are received by the interlock sockets 32. Upon complete insertion as shown in FIG. 2, the connection and interlock circuits 22 and 28 are both closed at the first connector 24 in its fully connected position where the connection sockets 30 receive the connection prongs 36 and the interlock sockets 32 receive the interlock prongs 38. Furthermore, upon detachment of the plug 34 from the receptacle 29, the interlock prongs 38 disengage the interlock sockets 32 before the connection prongs 36 disengage the connection sockets 30 such that the interlock circuit 28 is open at the first connector 24 before the connection circuit 22 is opened at the first connector.

As shown in FIGS. 2 and 3, the electrical connection and circuit system 20 also includes an electrical power connection housing 46 and the second connector 26 includes a housing mounted receptacle 48 which has connection and interlock sockets 50 and 52, respectively. The second connector 26 also has a plug 54 having connection prongs 56 and interlock prongs 58 that are respectively received by the connection sockets 50 and interlock sockets 52 of the housing mounted receptacle 48 to close the connection and interlock circuits at the second connector. More specifically, the connection sockets 50 are connected by wires 60 to an AC/DC convertor 62 while the interlock sockets 52 are connected to each other by a wire 64. The connection and interlock sockets 50 and 52 of the housing mounted receptacle 48 and the connection and interlock prongs 56 and 58 of the plug 54 of the second connector 26 are positioned such that the connection circuit 22 is closed at the second connector in the partially connected position thereof shown by solid line representation in FIG. 3 while the interlock circuit 28 is open. In other words, the interlock prongs 58 are disengaged from the interlock sockets 52 in the partially connected position while the connection prongs 56 are engaged with the connection sockets 50 in the partially connected position of FIG. 3. Furthermore, the connection and interlock sockets 50 and 52 of the housing mounted receptacle 48 and the connection and interlock prongs 56 and 58 of the plug 54 of the second connector 26 are both closed at the second connector in its fully connected position of FIG. 1.

The construction of the first and second connectors 24 and 26 as described above and as is hereinafter more fully described prevents any arcing at either connector of the high voltage of the connection circuit 22 during connection or disconnection of the connector 24 or 26 during routine maintenance or other servicing.

As illustrated in FIGS. 2 and 3, the electrical connection and interlock circuit system 20 also includes a third connector 66 that is connected to the drive motor 16 and detachably connected to the electrical power connection housing 46 upon movement between detached and connected positions as respectively illustrated by phantom and solid line representation in FIG. 2 to energize the drive motor 16 when the first and second connectors 24 and 26 are in their fully connected positions and connected by the interlock circuit 28. The second connector 26 also has a mechanical interlock 68 that prevents detachment of the third connector 66 from the power connection housing 46 when the second connector 26 is connected to the power connection housing. The third connector 66 like the second connector 26 has a housing mounted receptacle 70 having sockets 72 connected by wires 74 to the convertor 62. As illustrated, there are three such sockets 72 for providing three phase power to motor 16. Furthermore, the third connector 66 also includes a plug 76 having prongs 78 that are received by the sockets 72 of the associated receptacle 70. The mechanical interlock 68 of the second connector 26 includes an interlock plug portion 80 that is positioned over the plug 76 of the third connector 66 when the second and third connectors 24 and 66 are both connected to the power connection housing such that the third connector cannot be disconnected as shown by phantom line representation in FIG. 2 until the second connector is disconnected. Plug 76 of the third connector 66 has its prongs 78 respectively connected by three wires 82 to the motor 16 in order to supply the three phase power. During attachment and detachment of the third connector 66 which energizes the motor 16, there thus cannot be any arching at this connector since the power connection housing 46 is then de-energized in view of the fact that the second connector 26 must be disconnected in order for the third connector 66 to be connected or disconnected as a result of the mechanical interlock 68 with its interlock plug portion 80 as described above.

Interlock circuit 28 shown in FIGS. 2 and 3 includes a controller 84 having an interlock switch 86 that is disposed along each of a pair of wires 88 of the connection circuit 22 between the connector prongs of the first and second connector plugs 34 and 54. The controller 84 of interlock circuit 28 also includes an actuator 90 that closes the interlock switch 86 when the first and second connectors 24 and 26 are in their fully connected positions of FIG. 2 and opens the interlock switch when either the first or second connector is in its partially connected position of FIG. 3. More specifically, the interlock switch 86 of the controller is normally open as provided by a spring bias 92 and the actuator 90 includes a coil 94 that is disposed along one of two wires 96 of the interlock circuit 28 between the interlock prongs of the first and second connector plugs 34 and 54. A low voltage battery 98 along one of the wires 96 energizes the interlock circuit 28 so that the closing of the interlock circuit 28 as the first and second connectors 24 and 26 are fully connected energizes the coil 94 of the actuator 90 to overcome the spring bias 92 and to thereby close the interlock switch 86. However, this closure does not take place until after the sockets and prongs of the connection circuit 22 are initially engaged so that there is no arcing at either the first or second connector 24 or 26 during connection and disconnection at the connector. Interlock circuit 28 also preferably includes an inertia responsive switch 100 of any conventional type for opening the interlock circuit upon abrupt vehicle deceleration such that the coil 94 of controller 84 is then de-energized to open the interlock switch 86 of the controller and electrically disconnect the first and second connectors 24 and 26 of the connection circuit 22.

As illustrated in FIG. 2, the first connector 24 includes a retainer 102 such as a threaded fastener for securing the connector in its fully connected position by extending through the plug 34 into a suitable threaded fitting within the receptacle 28. Likewise, the second connector 26 includes a retainer 104 such as a threaded fastener for securing the connector in its fully connected position by extending through the plug 54 thereof into a suitable threaded fitting within the receptacle 48 of the housing 46. These retainers 102 and 104 are thus connected to retain the connectors in the fully connected position and are released such as by unthreading to allow disconnection of the associated connector.

Figure 4:
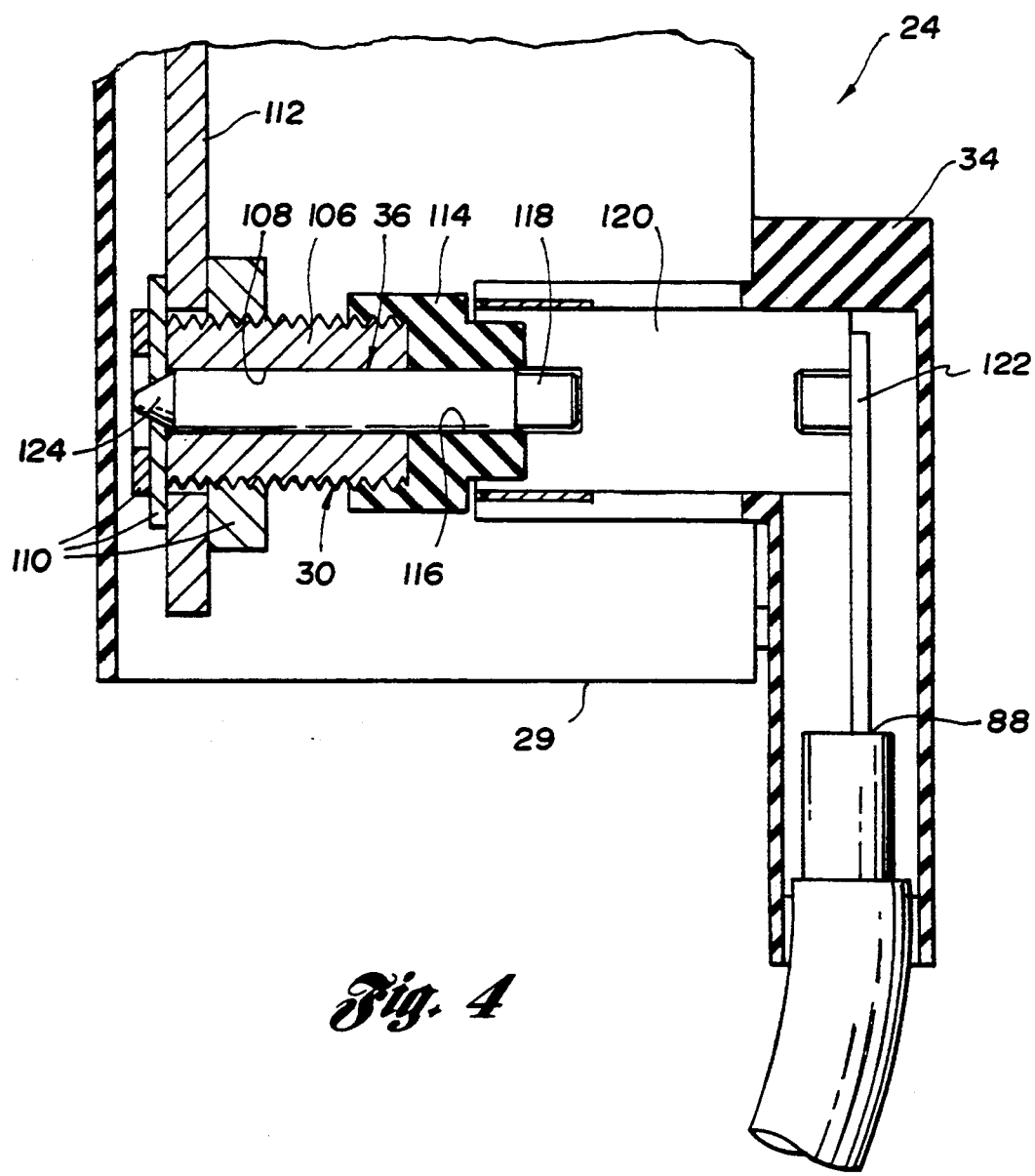
FIG. 4 is a sectional view illustrating the socket and prong construction of the circuit system.

With reference to FIG. 4, one connection socket 30 and associated connection prong 36 of the first connector 24 are illustrated and are illustrative of the other sockets and prongs described above. More specifically, the socket 30 includes a conductive socket member 106 having a central opening 108 and an outer threaded construction. One end of the conductive socket member 106 is mounted by connection members 110 on a conductive support 112 while the other end has an insulator 114 supported thereon in a threaded relationship. This insulator 114 has a central opening 116 that is aligned with the opening 108 of the conductive socket member 106. Prong 36 of plug 34 has one end 118 mounted by a fuse 120 on the plug 34 with the associated wire 88 of the connection circuit having an end 122 also connected to the fuse.

Upon connection of the plug 34 illustrated in FIG. 4, a distal end 124 of the prong 36 is initially inserted through the opening 116 of the insulator 114 prior to insertion into the opening 108 of the conductive socket member 106 to provide the electrical connection which is thus isolated from the person connecting the plug.

While the best mode for carrying out the invention has been described in detail, those familiar with the art to which this invention relates will recognize various alternative designs and embodiments for practicing the invention as defined by the following claims.

We claim:

1. In a vehicle electric drive including a battery and an electric drive motor for driving vehicle wheels, an electrical connection and interlock circuit system, comprising: a connection circuit having a first connector for detachably connecting to the battery upon movement between a detached position and a fully connected position through a partially connected position; the connection circuit also having a second connector for detachably connecting to the drive motor upon movement between a detached position and a fully connected position through a partially connected position; and an electrical interlock circuit that: (a) electrically connects the first and second connectors with each other when both connectors are in their fully connected positions to thereby permit electrical operation of the drive motor through the connection circuit, and (b) electrically disconnects the first and second connectors from each other when either connector is in its partially connected position to ensure that the drive motor is then not electrically energized through the connection circuit.

2. An electrical connection and interlock circuit system as in claim 1 wherein the first connector includes a battery mounted receptacle having connection sockets and interlock sockets, the first connector also including a plug having connection prongs and interlock prongs that are respectively received by the connection sockets and interlock sockets of the battery mounted receptacle to close the connection and interlock circuits at the first connector, and the connection and interlock sockets of the battery mounted receptacle and the connection and interlock prongs of the plug of the first connector being positioned such that (a) the connection circuit is closed at the first connector in the partially connected position thereof while the interlock circuit is open, and (b) the connection and interlock circuits are both closed at the first connector in its fully connected position.

3. An electrical connection and interlock circuit system as in claim 1 which includes an electrical power connection housing, the second connector including a housing mounted receptacle having connection and interlock sockets, the second connector also including a plug having connection prongs and interlock prongs that are respectively received by the connection sockets and interlock sockets of the housing mounted receptacle to close the connection and interlock circuits at the second connector, and the connection and interlock sockets of the housing mounted receptacle and the connection and interlock prongs of the plug of the second connector being positioned such that (a) the connection circuit is closed at the second connector in the partially connected position thereof while the interlock circuit is open, and (b) the connection and interlock circuits are both closed at the second connector in its fully connected position.

4. An electrical connection and interlock circuit system as in claim 1 which includes an electrical power connection housing at which the second connector is detachably connected, the connection circuit also having a third connector that is connected to the drive motor and detachably connected to the electrical power connection housing upon movement between detached and connected positions to energize the drive motor when the first and second connectors are in their fully connected positions and connected by the interlock circuit, and the second connector having a mechanical interlock that prevents detachment of the third connector from the power connection housing when the second connector is connected to the power connecting housing.

5. An electrical connection and interlock circuit system as in claim 4 wherein the second and third connectors each includes an associated housing mounted receptacle having sockets and also includes an associated plug having prongs that are received by the sockets of the associated receptacle, and the mechanical interlock of the second connector including an interlock plug portion that is positioned over the plug of the third connector when the second and third connectors are both connected to the power connection housing such that the third connector cannot be disconnected until after the second connector is disconnected.

6. An electrical connection and interlock circuit system as in claim 1 wherein the interlock circuit includes a controller having an interlock switch for opening and closing the connection circuit between the first and second connectors, and the controller also including an actuator that closes the interlock switch when the first and second connectors are in their fully connected positions and that opens the interlock switch when either the first or second connector is in its partially connected position.

7. An electrical connection and interlock circuit system as in claim 6 wherein the interlock switch of the controller is normally open and wherein the actuator of the controller includes a coil that is energized by the interlock circuit to close the interlock switch when the first and second connectors are in their fully connected positions.

8. An electrical connection and interlock circuit system as in claim 7 wherein the interlock circuit includes an inertia response switch for opening the interlock circuit upon abrupt vehicle deceleration such that the coil of the controller is then de-energized to open the switch of the controller and electrically disconnect the first and second connectors of the connection circuit.

9. An electrical connection and interlock circuit system as in claim 1 wherein the first connector includes a retainer for securing the first connector in its fully connected position.

10. An electrical connection and interlock circuit system as in claim 1 wherein the second connector includes a retainer for securing the second connector in its fully connected position.

11. An electrical connection and interlock circuit system as in claim 1 wherein the first and second connectors each includes an associated retainer for securing the associated connector in its fully connected position.

12. In a vehicle electric drive including a battery and an electric drive motor for driving vehicle wheels, an electrical connection and interlock circuit system, comprising: a connection circuit having a first connector for detachably connecting to the battery upon movement between a detached position and a fully connected position through a partially connected position; the connection circuit also having a second connector for detachably connecting to the drive motor upon movement between a detached position and a fully connected position through a partially connected position; an electrical interlock circuit that: (a) electrically connects the first and second connectors with each other when both connectors are in their fully connected positions to thereby permit electrical operation of the drive motor through the connection circuit, and (b) electrically disconnects the first and second connectors from each other when either connector is in its partially connected position to ensure that the drive motor is not electrically energized through the connection circuit; the first connector including a battery mounted receptacle having connection sockets and interlock sockets; the first connector also including a plug having connection prongs and interlock prongs that are respectively received by the connection sockets and interlock sockets of the battery mounted receptacle to close the connection and interlock circuits at the first connector; the connection and interlock sockets of the battery mounted receptacle and the connection and interlock prongs of the plug of the first connector being positioned such that (a) the connection circuit is closed at the first connector in the partially connected position thereof while the interlock circuit is open, and (b) the connection and interlock circuits are both closed at the first connector in its fully connected position; an electrical power connection housing; the second connector including a housing mounted receptacle having connection and interlock sockets; the second connector also including a plug having connection prongs and interlock prongs that are respectively received by the connection sockets and interlock sockets of the housing mounted receptacle to close the connection and interlock circuits at the second connector; and the connection and interlock sockets of the housing mounted receptacle and the connection and-interlock prongs of the plug of the second connector being positioned such that (a) the connection circuit is closed at the second connector in the partially connected position thereof while the interlock circuit is open, and (b) the connection and interlock circuits are both closed at the second connector in its fully connected position.

13. In a vehicle electric drive including a battery and an electric drive motor for driving vehicle wheels, an electrical connection and interlock circuit system, comprising: a connection circuit having a first connector for detachably connecting to the battery upon movement between a detached position and a fully connected position through a partially connected position; the connection circuit also having a second connector for detachably connecting to the drive motor upon movement between a detached position and a fully connected position through a partially connected position; an electrical interlock circuit that: (a) electrically connects the first and second connectors with each other when both connectors are in their fully connected positions to thereby permit electrical operation of the drive motor through the connection circuit, and (b) electrically disconnects the first and second connectors from each other when either connector is in its partially connected position to ensure that the drive motor is not electrically energized through the connection circuit; the first connector including a battery mounted receptacle having connection sockets and interlock sockets; the first connector also including a plug having connection prongs and interlock prongs that are respectively received by the connection sockets and interlock sockets of the battery mounted receptacle to close the connection and interlock circuits at the first connector; the connection and interlock sockets of the battery mounted receptacle and the connection and interlock prongs of the plug of the first connector being positioned such that (a) the connection circuit is closed at the first connector in the partially connected position thereof while the interlock circuit is open, and (b) the connection and interlock circuits are both closed at the first connector in its fully connected position; an electrical power connection housing; the second connector including a housing mounted receptacle having connection and interlock sockets; the second connector also including a plug having connection prongs and interlock prongs that are respectively received by the connection sockets and interlock sockets of the housing mounted receptacle to close the connection and interlock circuits at the second connector; the connection and interlock sockets of the housing mounted receptacle and the connection and interlock prongs of the plug of the second connector being positioned such that (a) the connection circuit is closed at the second connector in the partially connected position thereof while the interlock circuit is open, and (b) the connection and interlock circuits are both closed at the second connector in its fully connected position; a third connector that is connected to the drive motor and detachably connected to the electrical power connection housing upon movement between detached and connected positions to energize the drive motor when the first and second connectors are in their fully connected positions and connected by the interlock circuit; and the second connector having a mechanical interlock that prevents detachment of the third connector from the power connection housing when the second connector is connected to the power connector housing.

14. An electrical connection and interlock circuit system as in claim 13 wherein the third connector includes a housing mounted receptacle having sockets and a plug having prongs that are received by the sockets of the receptacle of the third connector; and the mechanical interlock of the second connector including an interlock plug portion that is positioned over the plug of the third connector when the second and third connectors are both connected to the power connection housing such that the third connector cannot be disconnected until after the second connector is disconnected.

* * * * *